Feb. 12, 1957  W. A. BARDEN  2,781,436
VARIABLE RESISTOR WITH MEANS FOR PREVENTING SHAFT RATTLE
Filed Aug. 3, 1955  2 Sheets-Sheet 1
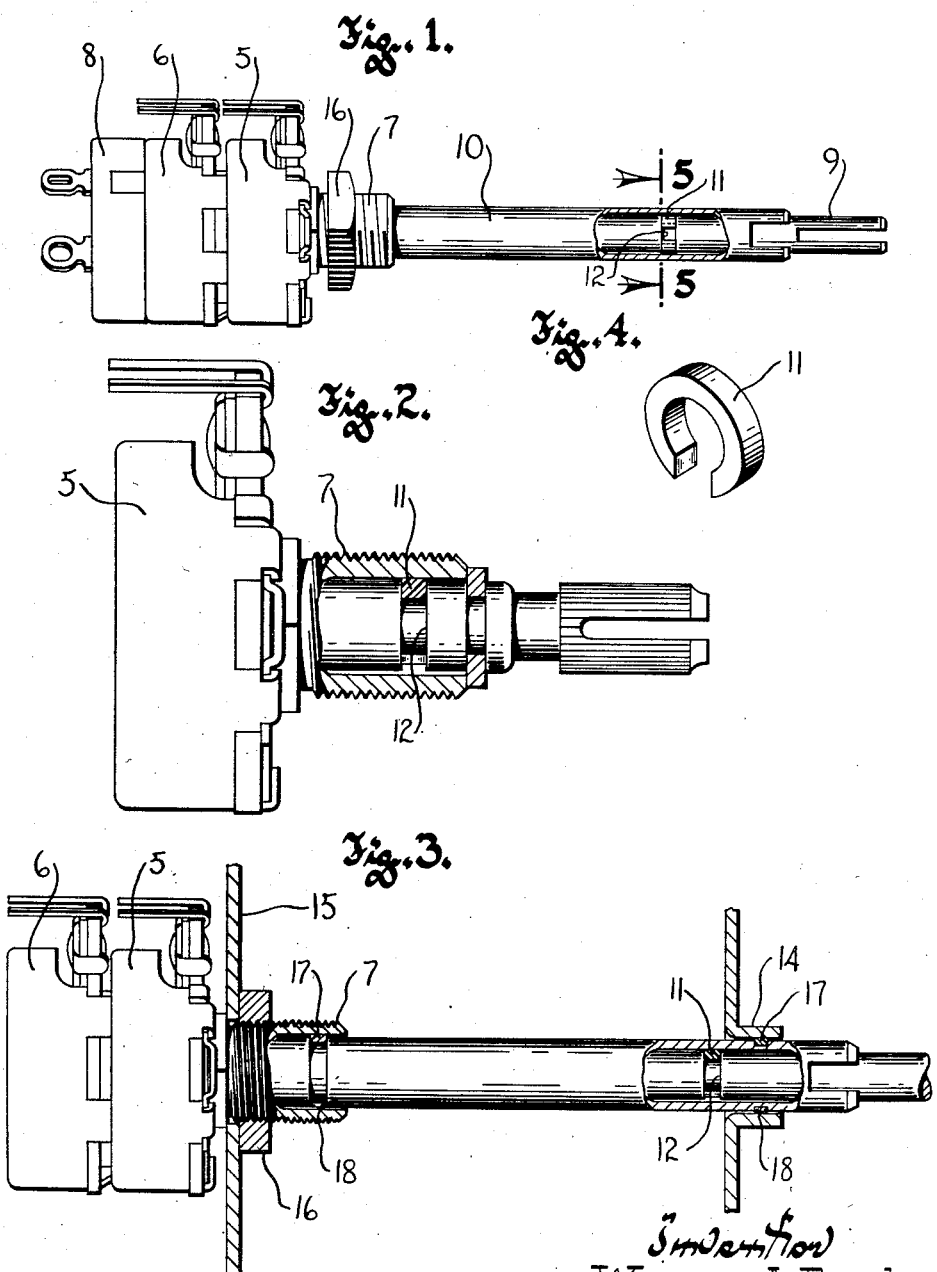

Feb. 12, 1957  W. A. BARDEN  2,781,436
VARIABLE RESISTOR WITH MEANS FOR PREVENTING SHAFT RATTLE
Filed Aug. 3, 1955  2 Sheets-Sheet 2

Inventor
Wayne A. Barden
By
Attorney 2,781,436

VARIABLE RESISTOR WITH MEANS FOR PREVENTING SHAFT RATTLE

Wayne A. Barden, Elkhart, Ind., assignor to Chicago Telephone Supply Corporation, Elkhart, Ind., a corporation of Indiana Application August 3, 1955, Serial No. 526,217

9 Claims. (Cl. 201—55)

This invention relates to controls for radio and television apparatus and refers particularly to tandem connected variable resistors of the type especially designed for use in automobile radios.

In such tandem arranged controls the rotatable contactor assembly of the unit closest to the panel is driven by a tubular shaft or sleeve, while that of the other unit is driven by a solid shaft inside and projecting from the tubular shaft. To assure independent adjustment of each rotor assembly the telescoped shafts, of course, must be freely rotatable, one with respect to the other, and since dimensional variations are inevitable in mass production, such freedom can only be assured if substantial clearance exists between the inner and outer shafts; but excessive clearance permits the inner shaft to vibrate and rattle against the outer shaft when the control is in use in an automobile radio. This condition is particularly serious in modern automobile radio installations which often necessitate relatively long control shafts. Shafts as long as five inches are not uncommon.

This invention has as its purpose to provide means for eliminating vibration of the inner shaft within the outer shaft or at least damping the vibrations to the extent that they no longer create an objectionable rattle. Those skilled in this art will of course readily appreciate that any means provided for this purpose must be capable of resisting wear, and at the same time must not cause binding between shafts, or in anywise increase the torque needed to adjust the rotor assemblies. Any tendency for the adjustment of one shaft to drag with it the other shaft would be entirely unacceptable.

Therefore, it is another object of this invention to eliminate the rattle producing vibration between shafts in a way which will not interfere with the freedom of each rotor assembly to be independently adjusted.

With the above and other objects in view, which will appear as the description proceeds, this invention resides in the novel method and construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a side elevational view of a tandem connected variable resistor control of the type used in automobile radios, with part of the tubular shaft broken away to better illustrate the invention;

Figure 2 is a side elevational view with parts broken away and in section illustrating a single variable resistor equipped with this invention;

Figure 3 is a side elevational view with parts broken away and in section illustrating another embodiment of this invention;

Figure 4 is a perspective view of one of the elements of the invention;

Figure 5:
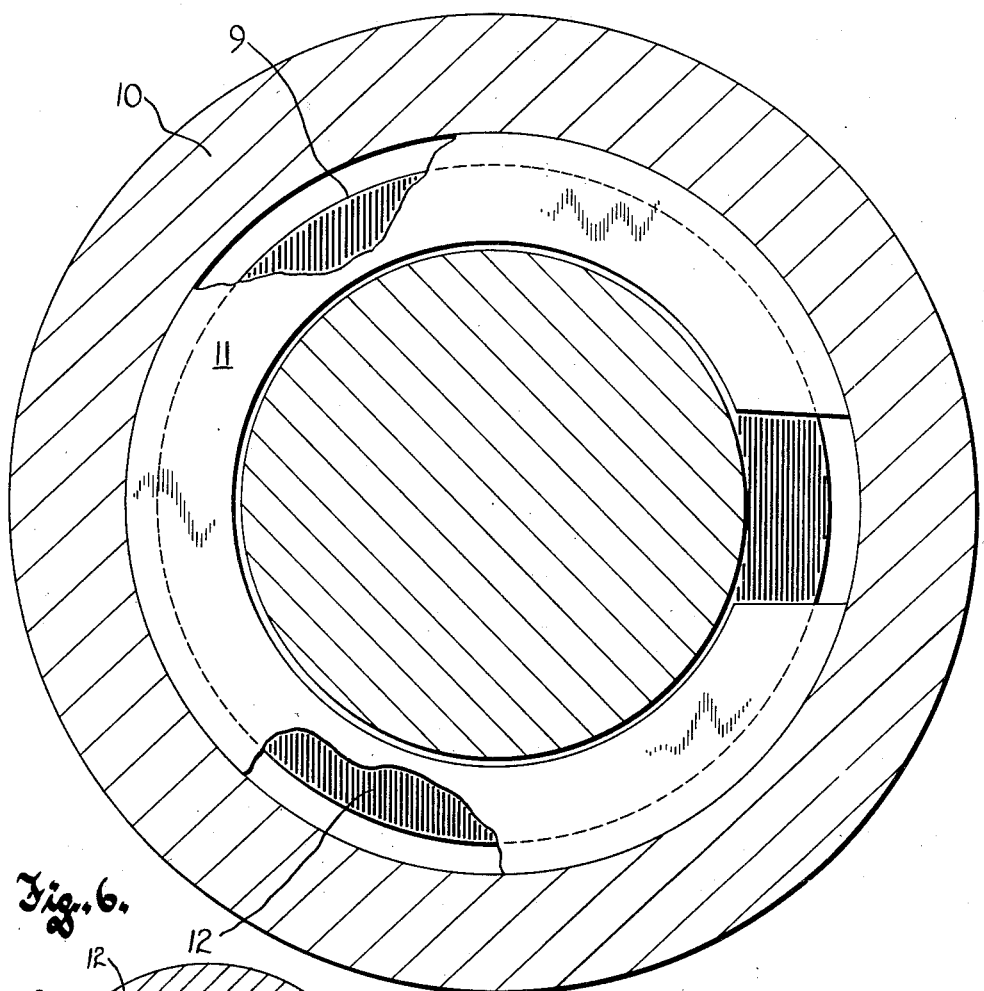
Figure 5 is an enlarged cross sectional view through Figure 1 on the plane of the line 5—5.

Referring now to the accompanying drawings, the numerals 5 and 6 designate two similar variable resistance devices arranged in tandem and connected to one another so that the two may be mounted as a single unit upon a panel which may be the front wall of the radio receiver chassis. Any suitable means may be employed to mount the control on the panel, as for instance a threaded bushing 7 projecting from the front or panel unit 5, and a nut 16 threaded onto the bushing.

The rear unit 6 in the device shown in Figure 1 has a switch 8 mounted on the back thereof to be actuated by the same control shaft 9 which adjusts the rotatable contactor assembly of the unit 6. The control shaft 9 is freely rotatably received in and projects a short distance from the front end of a tubular control shaft 10 by which the contactor assembly of the front or panel unit 5 is adjusted. As pointed out hereinbefore, it is not uncommon in such tandem arranged variable resistor controls of automobile radios to have relatively long operating shafts, and since it is important that the shafts be freely rotatable with respect to one another so that adjustment of one shaft does not drag with it the other, the clearance between the inner and outer shafts must be substantial, being on the order of .011″.

This necessary clearance between the inner and outer shafts creates a serious source of rattling when the control is in position in an automobile radio, and this objectionable rattle cannot be eliminated by merely packing the inner shaft with grease or other similar substances. Many expedients were tried in an effort to eliminate the vibration which produces this objectionable rattle, but heretofore all attempts to solve the problem failed.

The present invention solves the problem by using a collar 11 of non-compressible material arranged in a special way between the shafts. The material best suited for this collar is nylon, and the shape best adapted to the purpose, is that of a "C" washer as shown in Figure 4. This "C" washer or collar 11 is seated in an annular groove 12 of a width to snugly receive the collar therein, and of such depth that the diameter of the groove bottom is greater than the open throat of the "C." Hence, when snapped in place, the washer or collar retains itself assembled with the inner shaft 9.

The outside diameter of the "C" washer or collar 11, when in its free unrestrained condition, is a bit greater than the bore of the outer shaft or sleeve 10, so that when the parts are assembled, the collar is slightly deformed or reduced in diameter to assure firm engagement thereof with the bore of the outer shaft, but to prevent binding between the shafts, the inside diameter of the collar, even when received in the bore of the outer shaft, is slightly greater than the diameter of the bottom of the groove 12.

As best shown in Figure 5 the radial thickness of the collar 11, though less than the radial distance between the bore of the outer shaft and the bottom of the groove when the shafts are absolutely concentric, must be large enough to prevent contact of the inner shaft with the wall of the bore in which it turns. As a result, lateral displacement or vibration of the inner shaft is practically entirely eliminated, and in any event, the inner shaft is positively prevented from coming in contact with the bore of the outer shaft. The objectionable rattle is thus effectively prevented.

Although the outer tubular shaft 10 strictly speaking, would not normally be considered a bearing for the inner shaft 9, it can be so regarded, and accordingly, where the term "bearing" is used herein and in the claims, it should be understood to encompass the telescoped shaft construction described.

Figure 2 illustrates the adaptation of this invention to a control having but a single shaft turning directly in the mounting bushing 7. In such units there is of course, far less likelihood of vibratory rattling of the shaft, but to eliminate even the slight possibility which does exist, and at the same time permit even greater than normal clearance between shaft and bushing, a "C" washer 11 is confined between the bore of the bushing and the control shaft. As before, the washer or collar is seated in an annular groove 12 in the shaft and yieldingly bears against the bore of the bushing.

Figure 3 illustrates the adaptation of this invention to a special type of mounting which is sometimes encountered in automobile radios, and wherein the outer tubular shaft is supported by an additional outboard bearing 14 located at a substantial distance forwardly of the customary mounting panel 15 or front wall of the receiver chassis to which the control unit is secured as by a clamping nut 16 threaded on the mounting bushing 7. Since the reception of the outer end of the tubular shaft 10 in the outboard bearing 14 presents another source of rattling, a "C" washer or collar 17 is seated in a shallow groove 18 in the tubular shaft and bears against the bore of the bearing 14 to prevent rattle-producing contact between the outer shaft and the bearing 14. This embodiment of the invention, of course, also includes the anti-rattle collar between the mounting bushing 7 and the outer tubular shaft as well as between the inner and outer shafts.

Figure 6:
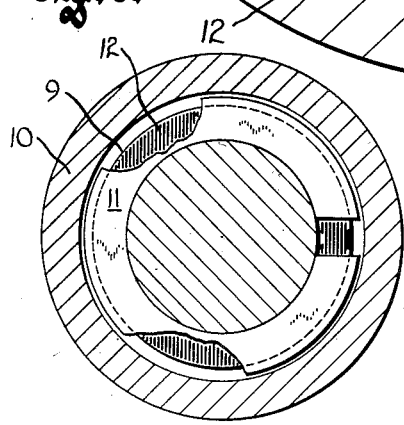
Figure 6 is a cross sectional view similar to Figure 5 but on a smaller scale illustrating a slightly modified dimensional relationship between the anti-rattle collar and the telescoped shafts.

In the embodiments of the invention thus far described, the anti-rattle collar has snug engagement with the bore of the outer tubular shaft, and is spaced slightly from the bottom of the groove in the inner shaft. By actual use that construction has been found to be highly satisfactory and most likely the preferred arrangement. However, it should be understood that the opposite condition depicted in Figure 6 could be employed if desired. In this case, the inside diameter of the anti-rattle collar when the collar is in its free unrestrained condition is slightly smaller than the diameter of the bottom of the groove 12, so that when the collar is seated in the groove it snugly grips the inner shaft and rotates therewith. The outside diameter of the collar in this embodiment of the invention is such that when the collar is in place, clearance exists between the collar and the bore of the outer tubular shaft 10. In other respects the construction illustrated in Figure 6 is the same as that of Figure 5.

From the foregoing description taken in connection with the accompanying drawings it will be readily apparent to those skilled in this art that this invention satisfactorily solves the problem of preventing objectionable rattling heretofore resulting from the vibratory engagement of the control shafts of automobile radios and the like.

What I claim as my invention is:

1. In a variable resistor having a contactor assembly including a shaft by which the contactor assembly may be adjusted, and a bearing in which said shaft is freely movably received; means for preventing rattle caused by vibration of the shaft in the bearing, without causing the shaft to bind in the bearing and thereby introduce undesirable high torque, said means comprising a spacing collar of substantially non-compressible material encircling a portion of the shaft, within the bearing, said collar having a radial thickness slightly less than the radial distance between the encircled portion of the shaft and the adjacent bore of the bearing, but great enough to prevent contact of the shaft with the bore of the bearing.

2. The structure set forth in claim 1, but wherein the said spacing collar is formed of nylon.

3. The structure of claim 1 further characterized by the fact that the shaft has an annular groove in the portion thereof encompassed by the bearing; and wherein said spacing collar is a "C" washer seated in said groove, the thickness of the "C" washed being slightly less than the radial distance between the bottom of the groove and the adjacent bore of the bearing but great enough to prevent contact of the shaft with the bore of the bearing.

4. The structure of claim 3 further characterized by the fact that the outside diameter of the "C" washer when in its normal free unrestrained condition is slightly larger than the bore of the bearing, so that when the parts are assembled the "C" washer engages the bore of the bearing with a spring tension.

5. In a control device of the character described having tandem arranged rotor assemblies and telescoped inner and outer shafts by which separate and independent adjustment of the rotor assemblies may be effected, the outer shaft being tubular and providing a bearing for the inner shaft, and there being sufficient clearance between the shafts to permit free unrestrained rotation of one with respect to the other despite the fact that said shafts may be relatively long; means to prevent rattle caused by vibration of the inner shaft within the outer tubular shaft, said means comprising a collar of substantially non-compressible material encircling an axially short portion of the inner shaft, said collar having a radial thickness slightly less than the radial distance between the encircled portion of the inner shaft and the adjacent bore of the tubular outer shaft but great enough to prevent contact of the inner shaft with the bore of the tubular outer shaft, and said collar being snugly engaged with the bore of the adjacent portion of the tubular shaft.

6. The structure of claim 5 further characterized by the fact that the inner shaft has an annular groove therein; and by the fact that the collar comprises a "C" washer seated in said annular groove.

7. The structure of claim 6, but wherein the "C" washer is formed of nylon.

8. In a variable resistor having a contactor assembly including a shaft by which the contactor assembly may be adjusted, and a bearing in which said shaft is freely movably received: means for preventing rattle caused by vibration of the shaft in the bearing, without causing the shaft to bind in the bearing and thereby introduce undesirable high torque, said means comprising an annular groove in the shaft within the bearing so that the bottom of the groove and the adjacent wall of the bore of the bearing provide opposing concentric wall surfaces; and a split collar of substantially non-compressible material seated in the annular grooves, said collar having a radial thickness slightly less than the distance between said opposing concentric wall surfaces but great enough to prevent contact of the shaft with the bore of the bearing, and said collar being of such a size when free and unrestrained that when assembled with the shaft and bearing, the collar is flexed out of its normal condition and snugly engages one of said two opposing concentric walls.

9. In a variable resistor the structure set forth in claim 8, but wherein the internal diameter of the split collar when the collar is free and unrestrained, is slightly less than the diameter of the bottom of the groove so that when the collar is in position on the shaft it snugly grips the bottom of the groove and is spaced slightly from the opposing wall portion of the bearing bore.

References Cited in the file of this patent

UNITED STATES PATENTS

| | | |
|---|---|---|
| 2,220,751 | Bergman | Nov. 5, 1940 |
| 2,303,499 | Rich | Dec. 1, 1942 |